(12) United States Patent
Wang et al.

(10) Patent No.: US 6,496,337 B1
(45) Date of Patent: Dec. 17, 2002

(54) COPPER ALLOY GMR RECORDING HEAD

(75) Inventors: Hui-Chuan Wang, Pleasanton, CA (US); Chyu-Jiuh Torng, Pleasanton, CA (US); Rong-Fu Xiao, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 09/528,565

(22) Filed: Mar. 20, 2000

(51) Int. Cl.[7] .................................................. G11B 5/39
(52) U.S. Cl. .................................................. 360/324.12
(58) Field of Search ............................. 360/324, 324.1, 360/324.11, 324.12, 324.2

(56) References Cited

U.S. PATENT DOCUMENTS

| | | | |
|---|---|---|---|
| 5,637,235 A | * 6/1997 | Kim et al. | 216/22 |
| 5,701,223 A | 12/1997 | Fontana, Jr. et al. | 360/113 |
| 5,790,351 A | 8/1998 | Suzuki | 360/113 |
| 5,850,323 A | * 12/1998 | Kanai | 360/324.11 |
| 5,898,548 A | * 4/1999 | Dill et al. | 360/324.2 |
| 5,920,446 A | 7/1999 | Gill | 360/113 |
| 6,046,892 A | * 4/2000 | Aoshima et al. | 360/324.11 |
| 6,175,477 B1 | * 1/2001 | Lin et al. | 360/324.12 |
| 6,201,671 B1 | * 3/2001 | Pinarbasi | 360/324.11 |
| 6,208,492 B1 | * 3/2001 | Pinarbasi | 360/324.11 |
| 6,219,208 B1 | * 4/2001 | Gill | 360/324.1 |
| 6,222,707 B1 | * 4/2001 | Huai et al. | 360/324.1 |
| 6,275,362 B1 | * 8/2001 | Pinarbasi | 360/324.12 |
| 6,278,592 B1 | * 8/2001 | Xue et al. | 360/324.12 |
| 6,292,336 B1 | * 9/2001 | Horng et al. | 360/324.12 |

* cited by examiner

*Primary Examiner*—David L. Ometz
(74) *Attorney, Agent, or Firm*—George O. Saile; Stephen B. Ackerman

(57) ABSTRACT

A spin valve structure that is thinner than currently available spin valves is described. This improvement is achieved through use of a thinner free layer. The key feature of the invention is the insertion of a seed enhancement layer between the seed and the free layer. The seed enhancement layer must have a FCC crystal structure, our preferred material for it being NiCu. When this layer is present, a constant GMR ratio of about 7% is obtained for a thickness range of the free layer of from 10 to 40 Angstroms. A process for manufacturing this structure is also disclosed.

18 Claims, 2 Drawing Sheets

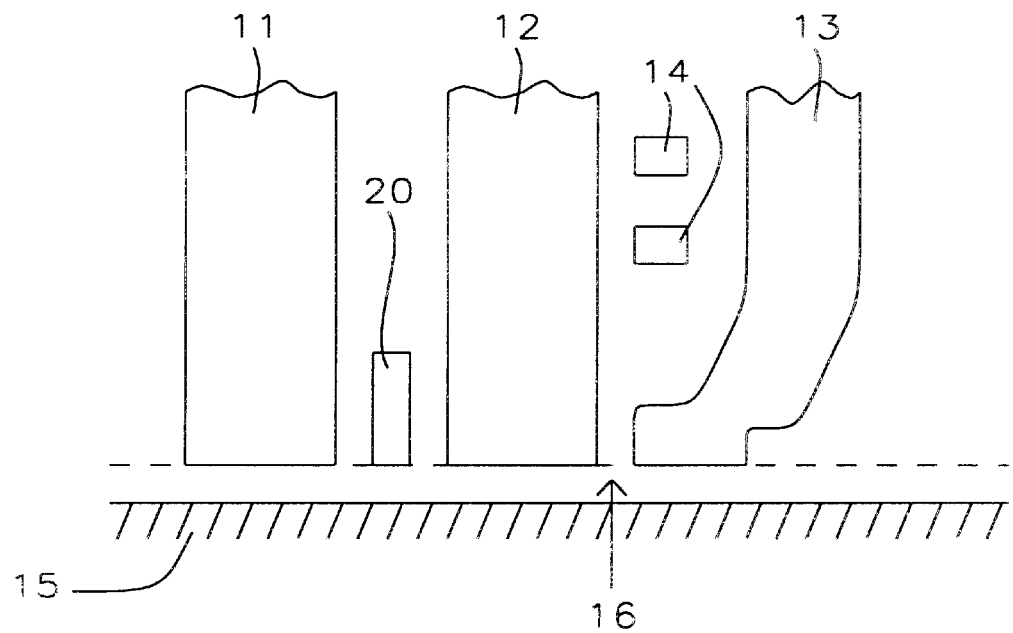
FIG. 1 – Prior Art
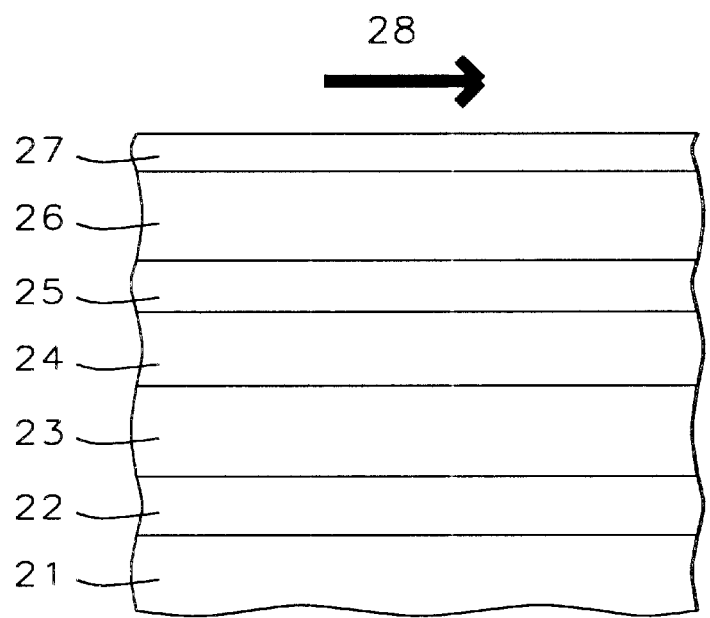
FIG. 2 – Prior Art

COPPER ALLOY GMR RECORDING HEAD

FIELD OF THE INVENTION

The invention relates to the general field of magnetic disk systems with particular reference to very thin GMR based read heads

BACKGROUND OF THE INVENTION

Read-write heads for magnetic disk systems have undergone substantial development during the last few years. In particular, older systems in which a single device was used for both reading and writing, have given way to configurations in which the two functions are performed by different structures. An example of such a read-write head is schematically illustrated in FIG. 1. The magnetic field that 'writes' a bit at the surface of recording medium 15 is generated by a flat coil, two of whose windings 14 can be seen in the figure. The magnetic flux generated by the flat coil is concentrated within pole pieces 12 and 13 which, while being connected at a point beyond the top edge of the figure, are separated by small gap 16. Thus, most of the magnetic flux generated by the flat coil passes across this gap with fringing fields extending out for a short distance where the field is still powerful enough to magnetize a small portion of recoding medium 15.

The present invention is directed towards the design of read element 20 which can be seen to be a thin slice of material located between magnetic shields 11 and 12 (12 doing double duty as a pole piece, as just discussed). The principle governing the operation of read sensor 20 is the change of resistivity of certain materials in the presence of a magnetic field (magneto-resistance). Most magnetic materials exhibit anisotropic behavior in that they have a preferred direction along which they are most easily magnetized (known as the easy axis). The magneto-resistance effect manifests itself as a decrease in resistivity when the material is magnetized in a direction perpendicular to the easy axis, said decrease being reduced to zero when magnetization is along the easy axis. Thus, any magnetic field that changes the direction of magnetization in a magneto-resistive material can be detected as a change in resistance.

It is widely known that the magneto-resistance effect can be significantly increased by means of a structure known as a spin valve. The resulting increase (known as Giant magneto-resistance or GMR) derives from the fact that electrons in a magnetized solid are subject to significantly less scattering by the lattice when their own magnetization vectors (due to spin) are parallel (as opposed to anti-parallel) to the direction of magnetization of the solid as a whole.

The key elements of a spin valve structure are shown in FIG. 2. In addition to a seed layer 22 on a substrate 21 and a topmost cap layer 27, these key elements are two magnetic layers 23 and 25, separated by a non-magnetic layer 24. The thickness of layer 24 is chosen so that layers 23 and 25 are sufficiently far apart for exchange effects to be negligible (the layers do not influence each other's magnetic behavior at the atomic level) but are close enough to be within the mean free path of conduction electrons in the material. If, now, layers 23 and 25 are magnetized in opposite directions and a current is passed though them along the direction of magnetization (such as direction 28 in the figure), half the electrons in each layer will be subject to increased scattering while half will be unaffected (to a first approximation). Furthermore, only the unaffected electrons will have mean free paths long enough for them to have a high probability of crossing over from 23 to 25 (or vice versa). However, once these electrons 'switch sides', they are immediately subject to increased scattering, thereby becoming unlikely to return to their original side, the overall result being a significant increase in the resistance of the entire structure.

In order to make use of the GMR effect, the direction of magnetization of one the layers 23 and 25 is permanently fixed, or pinned. In FIG. 2 it is layer 25 that is pinned. Pinning is achieved by first magnetizing the layer (by depositing and/or annealing it in the presence of a magnetic field) and then permanently maintaining the magnetization by over coating with a layer of antiferromagnetic material, or AFM, (layer 26 in the figure). Layer 23, by contrast, is a "free layer" whose direction of magnetization can be readily changed by an external field (such as that associated with a bit at the surface 15 of a magnetic disk).

The structure shown in FIG. 2 is referred to as a top spin valve because the pinned layer is at the top. It is also possible to form a 'bottom spin valve' structure where the pinned layer is deposited first (immediately after the seed and pinning layers). In that case the cap layer would, of course, be over the free layer.

A routine search of the prior art was conducted. While several references to various laminated structures within spin valves were encountered, none of these teach how the GMR ratio may be maintained at a high value while at the same time reducing the overall thickness of the structure. Several of the references found were, however, of interest. For example, Fontana, Jr. et al. (U.S. Pat. No. 5,701,223) forms a pinned layer by strongly coupling two ferromagnetic films in an antiferromagnetic configuration i.e. the two films have a relative antiparallel orientation. The magnetic moments of the two ferromagnetic layers are required to be almost the same. Under these conditions, a pinning layer of nickel oxide may be used and this has the advantage that a cap layer is no longer needed.

In U.S. Pat. No. 5,920,446, Gill describes a laminated free layer formed from two ferromagnetic layers separated by a non-magnetic, conducting spacer layer. A key feature is that the two outer layers of the laminate are coupled in an anti-parallel configuration. This arrangement allows the device to operate without a pinned (or pinning) layer.

In U.S. Pat. No. 5,790,351, Suzuki describes a magnetoresistive head in which longitudinal bias is supplied through a film positioned to be on either side of the magnetoresistive element, this sub-structure lying on a ground plane of copper.

SUMMARY OF THE INVENTION

It has been an object of the present invention to provide a spin valve structure that is both thinner than prior art structures as well as having a good GMR ratio.

Another object of the invention has been to enhance the magnetic-anisotropy of a GMR free layer made up of only CoFe or COFeX.

A further object of the invention has been to provide a process for manufacturing said spin valve structure.

These objects have been achieved by inserting a seed enhancement layer between the seed and the free layer. This seed enhancement layer must have a FCC crystal structure. Our preferred material for it has been NiCu. When this layer is present, a constant GMR ratio of about 7% is obtained for a thickness range of the free layer of from 10 to 40 angstroms. A process for manufacturing this structure is also disclosed.

BRIEF DESCRIPTION OF THE DRAWINGS

FIG. 1 is a schematic cross-section of a read-write head for a magnetic disk system.

FIG. 2 is a cross-section of a spin valve structure formed according to the teachings of the prior art.

DESCRIPTION OF THE PREFERRED EMBODIMENTS

Figure 3:
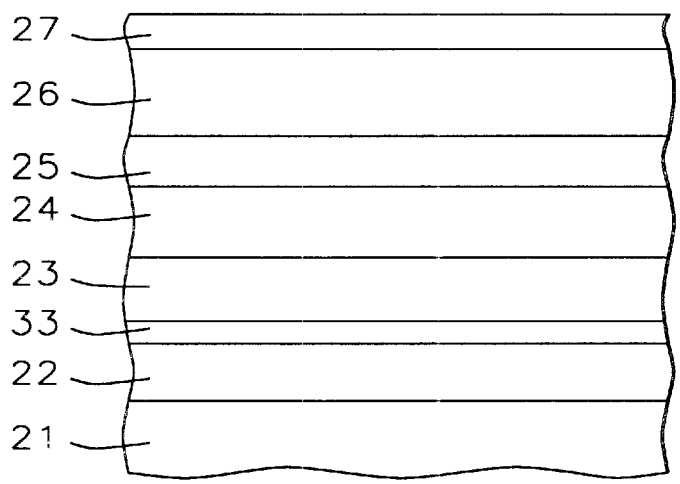
FIG. 3 is a cross-section of a spin valve structure formed according to the teachings of the present invention.

A constant goal in the development of recording heads is to increase the density of recorded data. One way of achieving this has been to reduce the thickness of as many of the layers making up the GMR structure as possible. One possible candidate for such thickness reduction is the material that makes up the free layer. However good magnetic softness is hard to get if CoFe or COFeX are used for the free layer.

A structure made up of Seed Layer/NiFe/CoFe/CuI Pinned Layer is widely used in today's GMR head manufacturing. By adjusting the NiFe and CoFe thickness the GMR ratio can be changed as well. This is shown in Table I.

TABLE I

Effect of varying thickness of a NiFe/CoFe free layer.

| x (Å) | y (Å) | $H_e$ (after anneal) | ΔR/R % (after anneal) | $R_s$ (after anneal) |
|---|---|---|---|---|
| 74.5 | 5 | 5.81 | 5.24 | 12.35 |
| 65 | 10 | 6.37 | 5.59 | 12.61 |
| 56.5 | 15 | 7.20 | 6.10 | 12.72 |
| 46.5 | 15 | 7.20 | 6.34 | 12.89 |
| 37 | 25 | 8.49 | 6.54 | 13.07 |
| 28 | 30 | 9.91 | 7.05 | 13.34 |

Structure Comprised
75 Å Ta/x NiFe/y CoFe/30 Å Cu/20 Å CoFe/200 Å MnPt/50 Å Ta, $H_e$=inter-layer coupling field (oe), and $R_s$=sheet resistance (ohm/sq.).

Table I shows that when CoFe gets thicker the GMR ratio will be larger. However the B-H curve will also show less anisotropy as free layer CoFe thickness increases, suggesting that the free layer CoFe thickness cannot be increased further in a spin valve structure because of problems with said magnetic hardness and low anisotropic constant.

The present invention shows how to retain the large GMR ratio together with the CoFe anisotropy and softness. This is accomplished by inserting a "seed enhancement" layer of a material having a face-centered cubic crystal structure (FCC) between the seed layer and the CoFe or CoFeX free layer, no nickel-iron being needed. Our preferred material for this seed enhancement layer has been a nickel-copper alloy but other FCC material such as copper, rhodium, palladium, silver, iridium, platinum, gold, and their alloys could also have been used. The effectiveness of the FCC seed enhancement layer is illustrated in TABLE II below:

TABLE II

Effect of inserting a seed enhancement layer.

| a (Å) | $H_e$ (after anneal) | ΔR/R% (after anneal) | $R_s$ (after anneal) | $H_c$ (after anneal) |
|---|---|---|---|---|
| 0 | 24.82 | 5.68 | 17.68 | 12.39 |
| 14 | 6.71 | 6.45 | 16.06 | 3.64 |

Structure Comprised
75 Å Ta/a NiCu/30 Å CoFe/30 Å Cu/20 Å CoFe/200 Å MnPt/50 Å Ta, $H_e$=inter-layer coupling field (oe), $R_s$=sheet resistance (ohm/sq.), and $H_c$=free layer coercivity (oe)

From TABLE II we can see that ΔR/R is 6.45% for a spin valve with NiCux underneath a 30A CoFe free layer, compared to 5.68% for a spin valve without NiCux.

Other measurements (not shown) confirm that GMR sensor magnetic softness and anisotropy are much better in this structure. This confirms that inserting a seed enhancement layer promotes proper FCC growth of CoFe or CoFeX which in turn provides the needed properties for optimum performance of the spin valve even for a very thin free layer. Additionally, CoFe has higher moment than NiFe which is another factor that allows the total thickness of the sensor to be reduced.

We now present a description of a process for manufacturing the structure of the present invention. This will also serve to disclose the structure of the present invention.

Referring, now to FIG. 3, the process of the present invention begins with the provision of substrate 21 on which is deposited seed layer 22, consisting of tantalum, an alloy of nickel and iron, an alloy of nickel, iron, and chromium, or zirconium. The seed layer is deposited to a thickness between about 10 and 150 Angstroms.

Then, as a key feature of the present invention as well as a departure from the prior art, seed enhancement layer 33 is deposited over seed layer 22. This seed enhancement layer must be a material that has a face-centered-cubic (FCC) crystal structure. Examples of materials suitable for use as a seed enhancement layer include nickel-copper, copper, rhodium. palladium, silver, iridium, platinum, gold, and their alloys. The seed enhancement layer is deposited to a thickness between about 3 and 80 Angstroms. By providing a more perfect crystal environment for the growth of the free layer, the seed enhancement layer enables the spin valve structure to function with a thinner free layer because of spin filter effects.

Free layer 23 is then deposited on the seed enhancement layer 33. Examples of materials suitable for the free layer include cobalt, cobalt-iron, alloys that include cobalt and iron, laminates of nickel-iron with cobalt-iron, laminates of nickel-iron with alloys that include cobalt and iron, and laminates of nickel-iron with cobalt. The free layer is deposited to a thickness between about 5 and 150 Angstroms, following which magnetically neutral copper layer 24 (between about 10 and 50 Angstroms thick) is laid down.

The remaining steps in the process are essentially routine for the art. Thus, magnetically pinned layer 25 is deposited on copper layer 24. The magnetically pinned layer is deposited to a thickness between about 5 and 80 Angstroms. Examples include cobalt, cobalt-iron, alloys that include cobalt and iron, and nickel-iron. Then, pinning layer 26 is deposited on pinned layer 25. This pinning layer is deposited to a thickness between about 20 and 400 Angstroms and candidates include iridium-manganese, iron-manganese, nickel-manganese, manganese platinum, manganese-platinum-chromium, and manganese-platinum-palladium. Note that layers 25 and 26 may be implemented as either a conventional pinned structure (ferromagnetic/ antiferromagnetic) or as a synthetic structure (ferromagnetic/ruthenium/ferromagnetic/ antiferromagnetic). In either case, the process concludes when cap layer 27 is deposited on pinning layer 26, the cap layer is the same material as the seed layer and has a thickness between about 5 and 100 Angstroms.

The net effect of using the above process (specifically including the step of inserting the seed enhancing layer) is to enable the formation of a spin valve structure that keeps the same GMR ratio even for a CoFe or CoFeX free layer having a thickness down to about 10 Angstroms.

Figure 4:
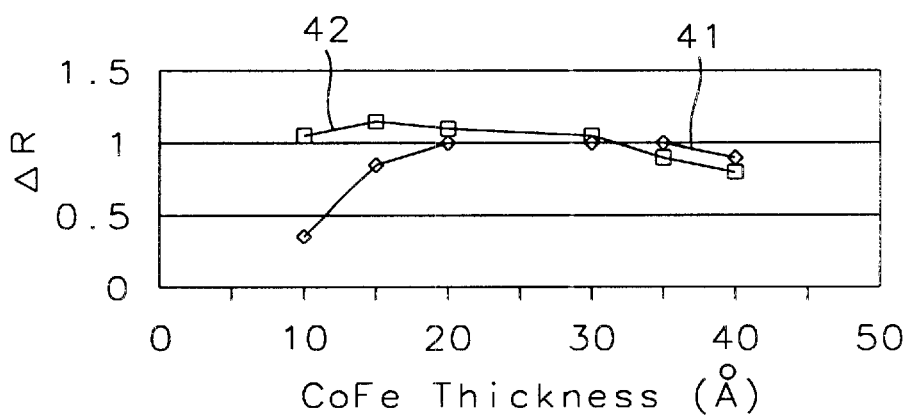
FIGS. 4 and 5 compare GMR characteristics as a function of free layer thickness for structures of the prior art and the present invention.
Figure 5:
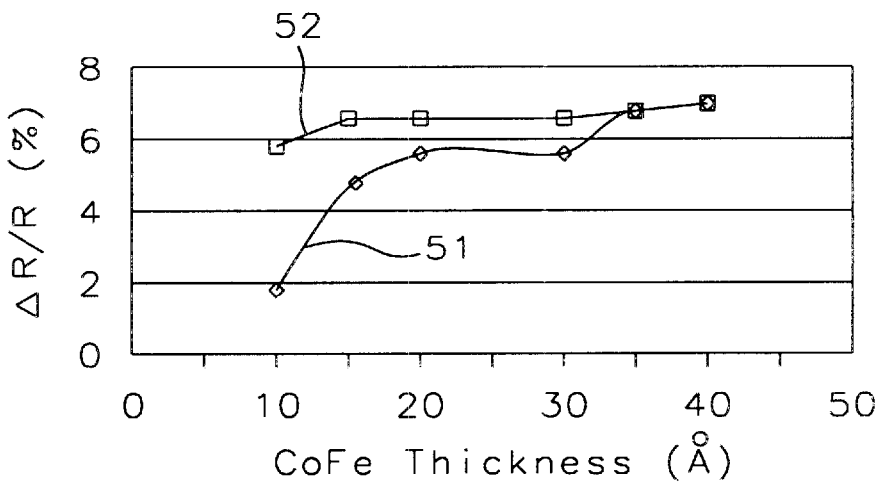

Confirmation of the effectiveness of the present invention is illustrated in the data summarized in FIGS. 4 and 5. In both figures the structure had a 75 Angstrom tantalum seed, a lower free layer of CoFe (whose thickness was varied), separated by 30 Angstroms of copper and topped with a 20 Angstrom CoFe pinned layer with 200 Angstroms of MnPt serving as the pinning layer. A 50 Angstrom Ta cap completed the structure.

In FIG. 4, we show the effect of varying the free layer thickness on ΔR. Curve 41 represents the prior art while curve 42 shows the result of including a 14 Angstrom thick seed enhancing layer. As can be seen, ΔR for the prior art structure is quite sensitive to the free layer thickness, particular at the low values that would be desirable for an ultra thin device, whereas it hardly changes for the structure of the present invention.

Even better characteristics over the prior art are seen when ΔR/R is plotted as a function of free layer thickness (see FIG. 5). This clearly shows that, for a device without the seed enhancement layer, ΔR/R goes from a low of 2% to a high of 6.8% over a range of from 10 to 40 Angstroms for the free layer whereas, with a seed enhancement layer included, ΔR/R goes from 6% to 6.8% over the same range.

While the invention has been particularly shown and described with reference to the preferred embodiments thereof, it will be understood by those skilled in the art that various changes in form and details may be made without departing from the spirit and scope of the invention.

What is claimed is:

1. A process for manufacturing a spin valve structure, comprising:
   providing a substrate;
   on said substrate, depositing a seed layer, selected from the group consisting of tantalum, an alloy of nickel and iron, an alloy of nickel, iron, and chromium, and of zirconium;
   depositing a seed enhancement layer, further comprising a material having a face-centered-cubic crystal structure, on the seed layer;
   depositing a free layer on the seed enhancement layer;
   depositing a layer of copper on the free layer;
   depositing a magnetically pinned layer on the copper layer;
   depositing a pinning layer on said pinned layer; and
   depositing a cap layer on the pinning layer, thereby forming a spin valve structure that keeps the same GMR ratio for CoFe and CoFeX free layers whose thickness is down to about 10 Angstroms.

2. The process of claim 1 wherein the seed layer is deposited to a thickness between about 10 and 150 Angstroms.

3. The process of claim 1 wherein the seed enhancement layer is selected from the group consisting of nickel-copper, copper, rhodium, palladium, silver, iridium, platinum, gold, and their alloys.

4. The process of claim 1 wherein the seed enhancement layer is deposited to a thickness between about 3 and 80 Angstroms.

5. The process of claim 1 wherein the free layer is selected from the group consisting of cobalt, cobalt-iron, alloys that include cobalt and iron, laminates of nickel-iron with cobalt-iron, laminates of nickel-iron with alloys that include cobalt and iron, and laminates of nickel-iron with cobalt.

6. The process of claim 1 wherein the free layer is deposited to a thickness between about 5 and 150 Angstroms.

7. The process of claim 1 wherein the magnetically pinned layer deposited to a thickness between about 5 and 80 Angstroms and is selected from the group consisting of cobalt, cobalt-iron, alloys that include cobalt and iron, and nickel-iron.

8. The process of claim 1 wherein the pinning layer is deposited to a thickness between about 20 and 400 Angstroms and is selected from the group consisting of iridium-manganese, iron-manganese, nickel-manganese, manganese platinum, manganese-platinum-chromium, and manganese-platinum-palladium.

9. The process of claim 1 wherein the cap layer is the same material as the seed layer.

10. A spin valve structure, comprising:
    a seed layer, selected from the group consisting of tantalum, an alloy of nickel and iron, an alloy of nickel, iron, and chromium, and of zirconium, on a substrate;
    on the seed layer, a seed enhancement layer that further comprises a material having a face-centered-cubic crystal structure;
    a free layer on the seed enhancement layer;
    a layer of copper on the free layer;
    a magnetically pinned layer on the copper layer;
    a pinning layer on said pinned layer;
    a cap layer on the pinning layer; and
    said spin valve structure having a constant GMR ratio for free layers whose thickness is down to about 10 Angstroms.

11. The spin valve described in claim 10 wherein the seed layer has a thickness between about 10 and 150 Angstroms.

12. The spin valve described in claim 10 wherein the seed enhancement layer is selected from the group consisting of nickel-copper, copper, rhodium, palladium, silver, iridium, platinum, gold, and their alloys.

13. The spin valve described in claim 10 wherein the seed enhancement layer has a thickness between about 3 and 80 Angstroms.

14. The spin valve described in claim 10 wherein the free layer is selected from the group consisting of cobalt, cobalt-iron, alloys that include cobalt and iron, laminates of nickel-iron with cobalt-iron, laminates of nickel-iron with alloys that include cobalt and iron, and laminates of nickel-iron with cobalt.

15. The spin valve described in claim 10 wherein the free layer has a thickness between about 5 and 150 Angstroms.

16. The spin valve described in claim 10 wherein the magnetically pinned layer has a thickness between about 20 and 400 Angstroms and is selected from the group consisting of cobalt, cobalt-iron, alloys that include cobalt and iron, and nickel-iron.

17. The spin valve described in claim 10 wherein the pinning layer has a thickness between about 20 and 400 Angstroms and is selected from the group consisting of iridium-manganese, iron-manganese, nickel-manganese, manganese platinum, manganese platinum-chromium, and manganese-platinum-palladium.

18. The spin valve described in claim 10 wherein the copper layer has a thickness between about 10 and 50 Angstroms.

* * * * *